(12) United States Patent  (10) Patent No.: US 11,875,200 B2
Gomes et al.  (45) Date of Patent: Jan. 16, 2024

(54) ADJUNCT PROCESSOR EXTENDED MESSAGE LIMIT FACILITY

(71) Applicant: INTERNATIONAL BUSINESS MACHINES CORPORATION, Armonk, NY (US)

(72) Inventors: Louis P. Gomes, Poughkeepsie, NY (US); Damian Osisek, Vestal, NY (US); Harald Freudenberger, Fellbach (DE); Richard John Moore, Waterlooville (GB); Volker Urban, Boeblingen (DE); Michael D. Hocker, Staatsburg, NY (US); Eric David Rossman, Wappingers Falls, NY (US); Richard Victor Kisley, Charlotte, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 145 days.

(21) Appl. No.: 17/483,344

(22) Filed: Sep. 23, 2021

(65) Prior Publication Data
US 2023/0089541 A1  Mar. 23, 2023

(51) Int. Cl.
*G06F 9/54* (2006.01)
*G06F 11/07* (2006.01)

(52) U.S. Cl.
CPC .......... *G06F 9/546* (2013.01); *G06F 11/0787* (2013.01)

(58) Field of Classification Search
None
See application file for complete search history.

(56) References Cited

U.S. PATENT DOCUMENTS

| | | | | |
|---|---|---|---|---|
| 6,704,871 | B1 * | 3/2004 | Kaplan | G06F 21/74 713/192 |
| 7,698,383 | B2 | 4/2010 | Goring et al. | |
| 7,844,056 | B1 * | 11/2010 | DeSanti | H04L 49/357 726/28 |
| 9,282,443 | B2 | 3/2016 | Cili et al. | |
| 2005/0053095 | A1 * | 3/2005 | Kato | G06K 7/0008 348/E5.097 |

(Continued)

OTHER PUBLICATIONS

IBM, "z/Architecture—Principles of Operation," IBM Publication No. SA22-7832-12, Thirteenth Edition, Sep. 2019, pp. Jan. 2000.

(Continued)

*Primary Examiner* — Syed A Roni
(74) *Attorney, Agent, or Firm* — Edward J. Wixted, III, Esq.; Blanche E. Schiller, Esq.; Heslin Rothenberg Farley & Mesiti P.C.

(57) ABSTRACT

A message limit value to be used in enqueuing one or more messages on a queue of a device of the computing environment is obtained. The message limit value indicates whether an extended maximum message length is supported by the device. The extended maximum message length is different from a default maximum message length supported by the device. Based on determining that the extended maximum message length is supported and that the obtained message limit value has a defined relationship with a select value, at least one message of an extended length is enqueued on the queue of the device.

25 Claims, 12 Drawing Sheets

(56) References Cited

U.S. PATENT DOCUMENTS

2016/0154677 A1* 6/2016 Barik .................. G06F 13/4239
　　　　　　　　　　　　　　　　　　　　　　　　718/105
2020/0081858 A1　　3/2020　Philmore et al.

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.
"Real-Time Risk Management—A View of MiFID II Compliance Challenges," Associates in Capital Markets, 2014 (no further date available), pp. 1-16.
George, Joshy, "Real-Time Integration/SOA using IBM WebSphere DataStage," IBM, 2019 (no further date available), pp. 1-5.
Anonymous, "An Extensible, Scalable, Optimized Multithreaded Data Loading Framework for Software Applications," IPCOM000240374D, Jan. 28, 2018, pp. 1-7 (+ cover).
Anonymous, "Methodology and Apparatus for Autonomic Messaging Object Closure and Disconnection, as Pre-Determined by The Application," IPCOM000212598D, Nov. 17, 2011, pp. 1-2 (+ cover).
Anonymous, "System and Method for Facilitating QCF Queue Space Utilization Notification and Take User Defined Action," IPCOM000156053D, Jul. 25, 2007, pp. 1-2 (+ cover).

* cited by examiner

ADJUNCT PROCESSOR EXTENDED MESSAGE LIMIT FACILITY

BACKGROUND

One or more aspects relate, in general, to facilitating processing within a computing environment, and in particular, to improving such processing.

Computing environments often include different types of processors to enhance processing. As an example, a computing environment may include one or more central processing units, which are considered the main processors, and one or more adjunct processors that are considered subordinate to the central processing units. An adjunct processor typically performs specific types of tasks. For instance, a particular example of an adjunct processor is a cryptographic (crypto) device which is used to perform cryptographic operations.

In one example, a machine may support attachment of cryptographic adjunct processor devices through an asynchronous programming interface, such as an enqueue instruction. The enqueue instruction accepts sequential portions of a request message, which are assembled in a buffer. When the complete message has been presented, it is transmitted to the adjunct processor device. Each interface to the device (e.g., adjunct processor queue) includes multiple entries, allowing several in-progress requests and their responses to be retained as they are processed by the adjunct processor.

SUMMARY

Shortcomings of the prior art are overcome, and additional advantages are provided through the provision of a computer program product for facilitating processing within a computing environment. The computer program product includes one or more computer readable storage media and program instructions collectively stored on the one or more computer readable storage media to perform a method. The method includes obtaining a message limit value to be used in enqueuing one or more messages on a queue of a device of the computing environment. The message limit value indicates whether an extended maximum message length is supported by the device. The extended maximum message length is different from a default maximum message length supported by the device. Based on determining that the extended maximum message length is supported and that the obtained message limit value has a defined relationship with a select value, at least one message of an extended length is enqueued on the queue of the device.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1A:
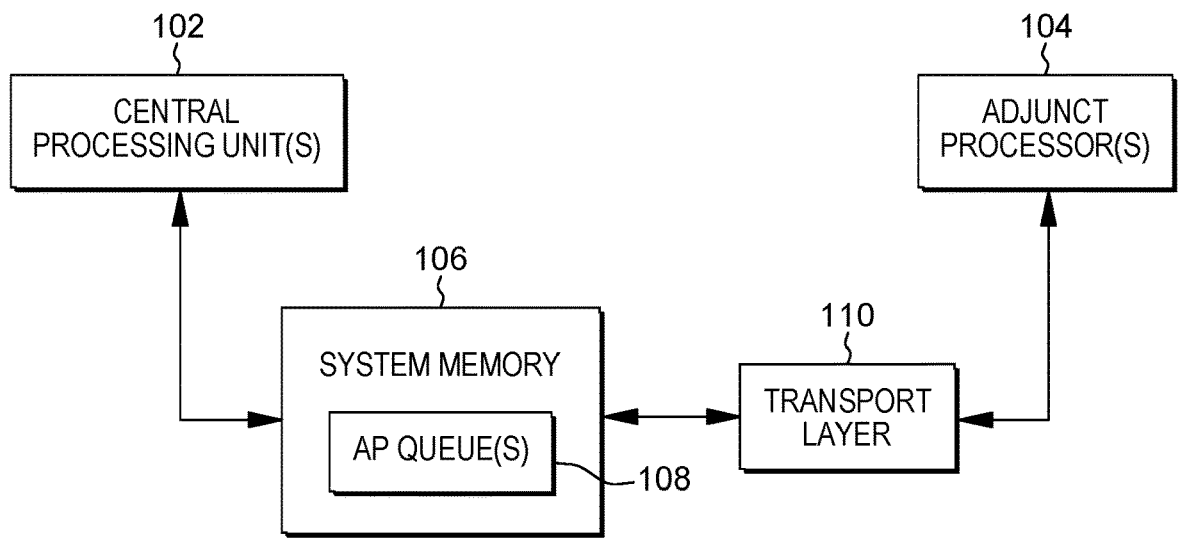
FIG. 1A depicts one example of a computing environment to incorporate and use one or more aspects of the present invention.

In one or more aspects of the present invention, a capability is provided to facilitate processing associated with adjunct processors (also referred to as adjunct processor devices). For instance, a capability is provided to allow extended message limits for messages to be enqueued on adjunct processor queues of such devices, in which the capability is backwards compatible. Further, in one or more aspects, a capability is provided to manage an incorrect message length condition.

One embodiment of a computing environment to incorporate and use one or more aspects of the present invention is described with reference to FIG. 1A. In one example, a computing environment 100 is based on the z/Architecture® instruction set architecture, offered by International Business Machines Corporation, Armonk, New York One embodiment of the z/Architecture instruction set architecture is described in a publication entitled, "z/Architecture Principles of Operation," IBM Publication No. SA22-7832-12, Thirteenth Edition, September 2019, which is hereby incorporated herein by reference in its entirety. The z/Architecture instruction set architecture, however, is only one example architecture; other architectures and/or other types of computing environments of International Business Machines Corporation and/or of other entities may include and/or use one or more aspects of the present invention. IBM and z/Architecture are trademarks or registered trademarks of International Business Machines Corporation in at least one jurisdiction.

As an example, computing environment 100 includes at least one central processing unit 102 and at least one adjunct processor (AP) 104, each of which is coupled to at least a portion of memory, referred to as system memory 106. As one example, system memory 106 includes a hardware system area, which is indirectly accessible and not visible to programs executing on the central processing unit(s). (Indirectly accessible is used herein to mean that the hardware system area or adjunct processor queue(s) stored therein (described below) are only accessible by specific limited instructions and not otherwise accessible (e.g., cannot load into it, programs are unaware of addresses, etc.)). Located within the system memory are one or more adjunct processor queues 108 (also referred to herein as one or more queues of one or more adjunct processors or devices). These queues include requests to be processed by adjunct processors. These queues are not directly visible from user programs and are instead considered a part of the machine (i.e., the machine that includes the central processing unit(s), system memory and adjunct processor(s)). A central processing unit has access to the queues in system memory by, for instance, issuing instructions to place requests on the queue, and/or to remove replies from the queue. Further, the adjunct processors have access to the queues via, e.g., a transport layer 110 (e.g., i390CO), which is responsible for taking requests off the queue, preparing the requests for forwarding to one or more adjunct processors to process the requests, and then placing replies to the requests on the queue.

Another embodiment of a computing environment to incorporate and use one or more aspects of the present invention is described with reference to FIG. 1B. In this embodiment, the machine includes virtual support, and there is at least one host central processing unit 150 that executes a plurality of guests 152 (e.g., guest operating systems and/or guest programs). The host central processing unit is coupled to at least a portion of memory, referred to as system memory 154. Additionally, there is at least one adjunct processor 156, which is also coupled to system memory 154 via, for instance, a transport layer 160. As one example, system memory 154 includes a hardware system area, and located within the system memory are one or more adjunct processor queues 158 (also referred to herein as one or more queues of one or more adjunct processors or devices).

One example of an adjunct processor is a cryptographic card or adapter, such as a Crypto Express card offered by International Business Machines Corporation, Armonk, New York. Further, one example of a machine that supports attachment of adjunct processor devices, such as cryptographic cards, is the IBM Z® machine offered by International Business Machines Corporation, Armonk, New York. IBM Z is a trademark or registered trademark of International Business Machines Corporation in at least one jurisdiction. Although an example cryptographic card is provided, other cryptographic cards offered by International Business Machines Corporation and/or other companies may incorporate and/or use one or more aspects of the present invention. Further, other types of adjunct processors may incorporate and/or use one or more aspects of the present invention.

In one embodiment, an adjunct processor supports a processing mode, which has an adjunct processor message structure and format. An adjunct processor message includes, for instance, multiple data segments and the data segments may not be adjacent to each other. These data segments are referred to as scatter gather data segments. In one example, a portion of the message (e.g., the bottom part of the adjunct processor message) contains the data to be used by, e.g., the cryptographic card to execute the adjunct processor command. Therefore, the adjunct processor command transport layer (e.g., transport layer 110, 160) copies the relevant data from the adjunct processor command request message, packages it in a format that the cryptographic card understands (e.g., crypto card's command request message) and sends it to the cryptographic card. Similarly, after the adjunct processor command is executed by the cryptographic card, the cryptographic card generates a cryptographic card command reply message and sends it to the adjunct processor command transport layer, which re-packages it into an adjunct processor command reply message. For instance, the transport layer uses various parts of the adjunct processor command request message and the cryptographic card's command reply message to provide the AP command reply message, including, e.g., a header, sub-header and packets. The transport layer then sends the adjunct processor command reply message to the adjunct processor queue to be dequeued later by the program.

In one example, a message has a maximum message length associated therewith that is imposed by the system. For instance, messages up to a default maximum message length (e.g., 12 KiB (kibibytes) in length) have been supported by an adjunct processor; however, for some sophisticated encryption techniques, including some quantum-safe techniques, the maximum default message length may be too restrictive. Therefore, in accordance with one or more aspects of the present invention, a technique is provided to enable an increase in the maximum message length for, e.g., new machines, new adjunct processors and/or new programs, while maintaining backwards compatibility for programs coded to the default maximum message length. Programs capable of supporting larger messages are to be able to recognize and adapt to the increased length on the processor and cryptographic device on which they are running. Thus, in accordance with one or more aspects of the present invention, an extended maximum message length supported by the system is reported to the program in a manner that is backwards compatible.

Figure 2:
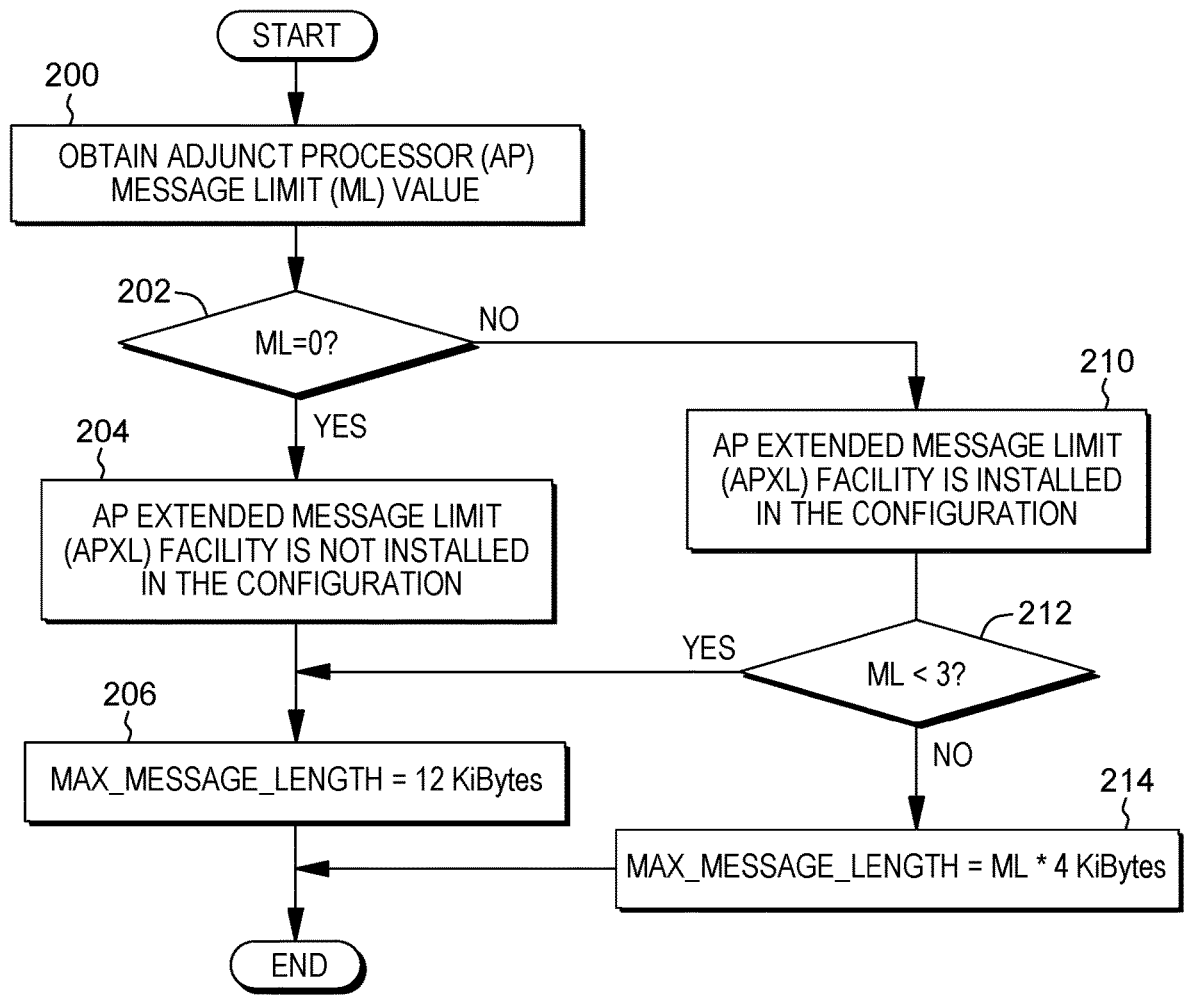
FIG. 2 depicts one example of determining a message limit, such as an adjunct processor message limit, for use in enqueuing messages on adjunct processor queues of a computing environment, in accordance with one or more aspects of the present invention.

The extended maximum message length is provided, in accordance with an aspect of the present invention, as part of an adjunct processor extended message facility, which is determined implicitly by the software based on the presence of an adjunct processor message limit field, e.g., in returned data. When the message limit field is not supported by the adjunct processors of the computing environment, the extended message limit facility is not installed in the configuration. However, in one example, if one or more adjunct processors of the computing environment (and not necessarily all of the adjunct processors) support an extended message limit, the extended message limit facility may be installed in the configuration. The use of the message limit field is further described with reference to FIG. 2.

In one example, an adjunct processor message limit (ML) value is obtained by, e.g., a program executing on a processor (e.g., processor 102, 150) of the computing environment 200. If the message limit value is set to a defined value (e.g., zero) 202, then it is determined that the adjunct processor extended message limit facility is not installed in the configuration 204, and thus, in one aspect, the maximum message length is determined to be a default maximum message length (e.g., 12 KiB or another value) 206. However, returning to inquiry 202, if the message limit value is not set to the defined value, then it is determined that the adjunct processor extended message facility is installed in the configuration 210.

Based on determining that the adjunct processor extended message facility is installed in the configuration, the obtained message limit value may be used to determine the maximum message length supported, which, in one embodiment, is greater than the default maximum message length. In one aspect, since the extended adjunct processor message length can become quite large and there may be limited space to designate the extended message length, the message limit field value does not simply represent a number of bytes but, for instance, a number of pages (e.g., 4 KiB) or other units of memory of other sizes. If the message limit field value equates (e.g., based on an equation) to, e.g., less than the default maximum message length (e.g., 12 KiB), then the default maximum message length is used; otherwise, the message limit field value is used to determine the maximum message length, which may be greater than the default maximum message length.

For instance, a determination is made as to whether the message limit value is less than a chosen value (e.g., 3) 212. If the message limit value is less than, e.g., 3, then the maximum message length is determined to be the default maximum message length (e.g., 12 KiB) 206; otherwise, the maximum message length is determined by a select equation (e.g., maximum message length is equal to the message limit multiplied by 4 KiB) 214.

In one example, the message limit is obtained from a general register (e.g., general register 2) by issuing, for instance, an instruction, such as a Process Adjunct Processor Queue instruction, an example of which is described with reference to FIGS. 3A-3D. The instruction is executed by, for instance, a processor (e.g., processor 102, 150).

Figure 3A:
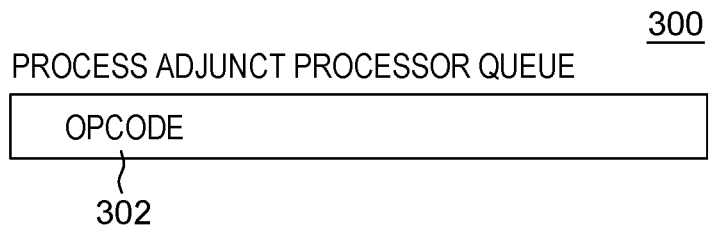
FIGS. 3A-3D depict an example of a Process Adjunct Processor Queue instruction used in accordance with one or more aspects of the present invention.

Referring to FIG. 3A, in one example, a Process Adjunct Processor Queue instruction 300 includes an operation code (opcode) 302 (e.g., bits 0-15 of a 32-bit instruction) that indicates a process operation of an adjunct processor queue. In one embodiment, the Process Adjunct Processor Queue instruction employs a plurality of general registers, including general registers 0, 1 and 2. The adjunct processor queue designated by the adjunct processor (AP) queue number (APQN) in general register 0 is processed according to the function code specified in general register 0. Examples of general registers 0, 1 and 2 are further described below.

Figure 1B:
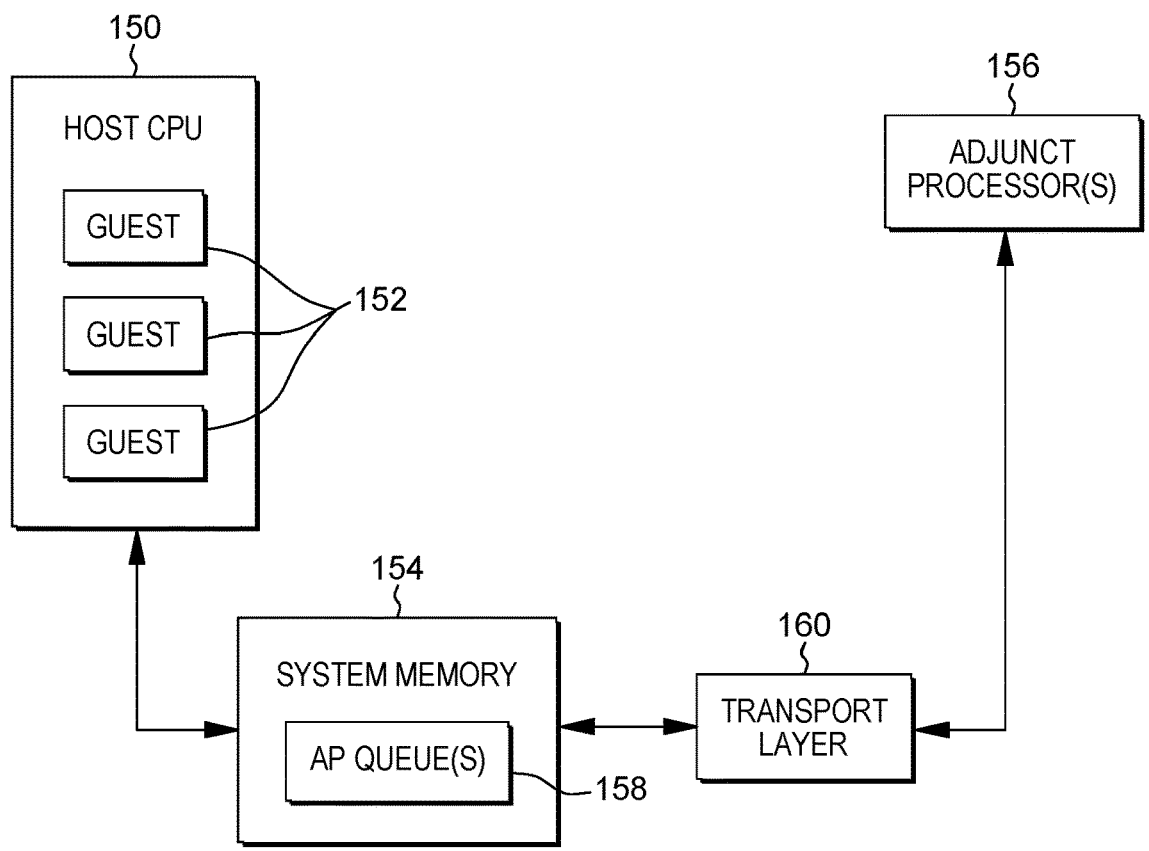
FIG. 1B depicts another example of a computing environment to incorporate and use one or more aspects of the present invention.
Figure 3B:
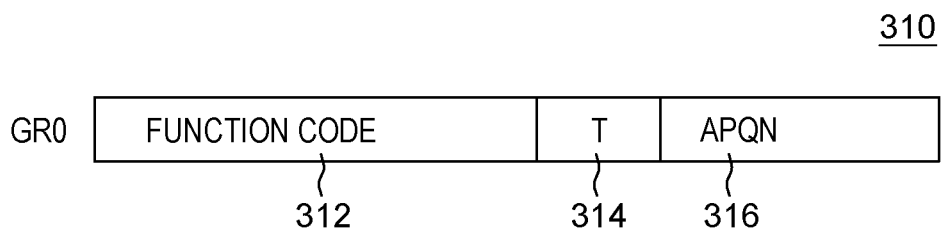

Referring to FIG. 3B, in one embodiment, general register 0 (GR0) 310 is, e.g., a 64-bit register that includes, for instance, a function code (FC) 312 (e.g., bits 32-39) to indicate a selected function to be performed; a test facilities indicator (T) 314 (e.g., bit 40) used to indicate whether a mask of installed facilities is to be returned in general register 2; and an adjunct processor queue number (APQN) 316 (e.g., bits 48-63) identifying an adjunct processor queue (e.g., AP queue 108 (FIG. 1A); AP queue 158 (FIG. 1B)) processed according to the function code.

Based on issuing the Process Adjunct Processor Queue instruction, function code 312 is to include one of a plurality of acceptable codes, an example of which is code 00 Test AP Queue (TAPQ).

In accordance with one or more aspects of the present invention, when the computing environment is in, e.g., z/Architecture architectural mode, and the adjunct processor facilities test (APFT) facility is installed, if the TAPQ function code is specified (e.g., FC=00 in GR0), bit 40 of general register 0, as an example, is defined as the test facilities bit (T) 314 for the TAPQ function. When T is one, bits 0-31 of general register 2, as an example, are replaced with a mask of installed AP facilities and other associated information, an example of which is described below. When T is zero, or the APFT facility is not installed, the results in general register 2 are confined to, e.g., bit positions 32-63, and bit positions 0-31 are ignored and unchanged.

As indicated, in addition to general register 0, general registers 1 and 2 are used by the Process Adjunct Processor Queue instruction, each of which is further described herein.

Figure 3C:
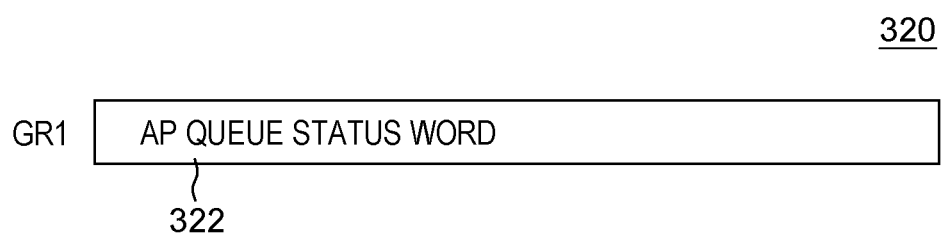

Referring to FIG. 3C, in one embodiment, general register 1 (GR1) 320 is, e.g., a 64-bit register that includes, for instance, an adjunct processor queue status word (APQSW) 322 (e.g., bits 32-63). At completion of the Process Adjunct Processor Queue instruction, the APQSW field contains an AP queue status word unless stated otherwise for a particular function. The AP queue status word indicates, e.g., the state of the AP queue at the completion of the instruction.

Figure 3D:
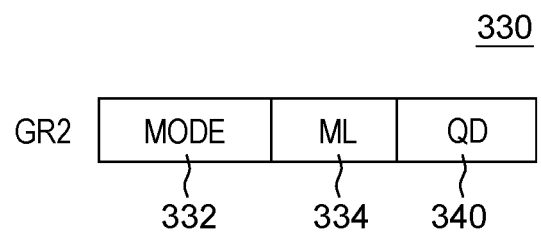

Further, with reference to FIG. 3D, in one embodiment, general register 2 (GR2) 330 is, e.g., a 64-bit register that includes a plurality of fields. As described herein, in one embodiment, bit positions 0-31, when set, include a mask of installed AP facilities and other associated information. Example fields of GR2, in accordance with one or more aspects of the present invention include, for instance:

Mode 332: When set, this field (e.g., bits 3-5) indicates a plurality of possible AP mode facilities. For instance, when D (e.g., bit 3) is one, the specified AP provides the co-processor mode facility; when A (e.g., bit 4) is one, the specified AP provides the accelerator mode facility; and when X (e.g., bit 5) is one, the specified AP provides the XCP mode facility. Other examples are possible;

ML 334: When this field (e.g., bits 52-55) is, e.g., zero, the adjunct processor extended message limit facility is not installed; and if it is other than, e.g., zero, the adjunct processor extended message limit facility is installed and this field may be used to determine the maximum message length, in accordance with one or more aspects of the present invention;

Number of Adjunct Processor Queue Entries (QD) 340: This field (e.g., bit positions 59-63) includes the number of queue entries on each adjunct processor queue in the configuration. QD is a value in the range, e.g., 0-31, representing a number of queue entries in the range, e.g., 1-32 decimal, as an example.

In one example, the installed facility information returned in general register 2 applies to all adjunct processors of the same adjunct processor type and—for consolidated adjunct processors (e.g., adjunct processor type 10 or higher)—in the same configuration mode. The installed facility information is, in one example, persistent at least until the next subsystem reset. A facility may be concurrently added. A facility may or may not be concurrently removed when the last adjunct processor of an adjunct processor type is deconfigured.

General register 2 is modified as defined when the TAPQ function completes with, e.g., condition code 0 (successful completion); or condition code 3, response codes, e.g., 02-05 (unexpected conditions: e.g., adjunct processor queue reset in progress, adjunct processor deconfigured, adjunct processor checkstop, adjunct processor busy). Otherwise, general register 2 is not modified.

Although specific fields, locations of fields, sizes of fields, bits and values of fields or bits are described in one embodiment herein for the Process Adjunct Processor Queue instruction and its associated registers, other fields, locations of fields, sizes of fields, bits and/or values of fields or bits may be used without departing from a spirit of one or more aspects of the invention. Fields and/or bits of each of the general registers not described herein may be blank, have a predefined value (e.g., zero), and/or include values to be ignored in one embodiment. Many possibilities exist.

As indicated herein, a machine may support attachment of cryptographic adjunct processor devices, and that attachment may be through, for instance, an asynchronous programming interface, such as an enqueue instruction. An enqueue instruction, such as the Enqueue Adjunct Processor Queue instruction of the z/Architecture instruction set architecture, accepts sequential portions of a request message, which are assembled in a buffer, referred to as an adjunct processor queue entry. When the complete message has been presented, it is transmitted to the adjunct processor. Each adjunct processor queue includes multiple entries, allowing several in-progress requests and their responses to be retained as they are processed by the adjunct processor.

The process of enqueuing a request to an adjunct processor queue, in general, is performed as a loop within a loop, with each iteration of the outer loop used to send a segment of the request message using an instruction, such as an Enqueue Adjunct Processor Queue instruction, as an example. The program indicates that it is sending the final segment by setting a last bit indication in, e.g., one of the registers used as input to the instruction. The system might not accept a message segment in its entirety, but instead take part of the segment and then request that the program continue to enqueue the remainder. In practice, a nested loop may not be needed because message parts and segments may be handled by the one loop. Even without a nested loop, the program cannot reliably avoid a partially full state by supplying the entire message in one enqueue adjunct processor instruction.

Further details relating to enqueuing a message are described with reference to FIGS. 4A-5G. For instance, FIGS. 4A-4B depict one example of processing logic associated with the Enqueue Adjunct Processor Queue instruction, and FIGS. 5A-5G depict a format/registers associated with one example of an Enqueue Adjunct Processor Queue instruction.

Figure 4A:
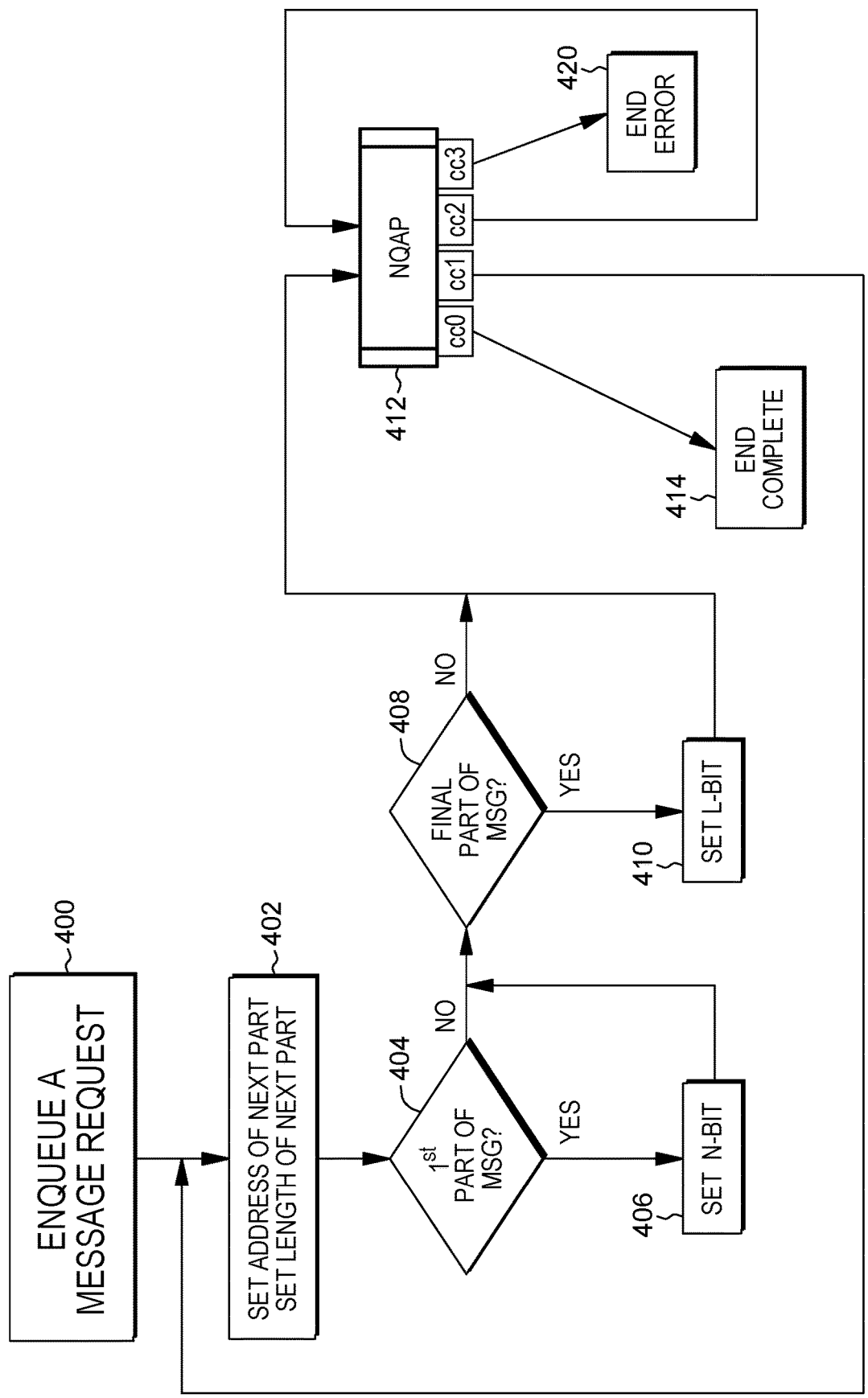
FIG. 4A depicts one example of enqueuing a message request on an adjunct processor queue, in accordance with one or more aspects of the present invention.
Figure 4B:
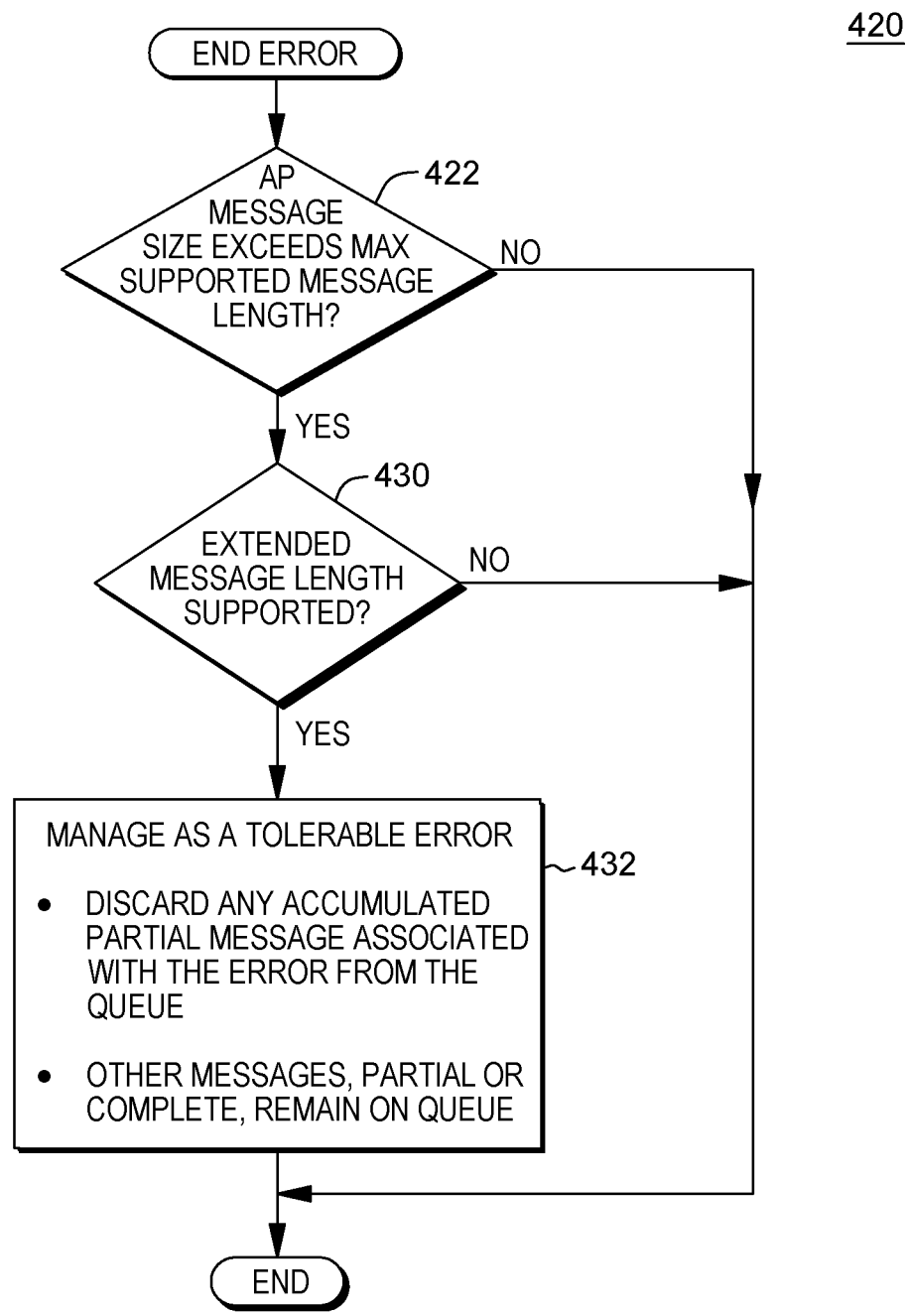
FIG. 4B depicts one example of processing an error that results from enqueuing the message request, in accordance with one or more aspects of the present invention.

Referring initially to FIG. 4A, a program initiates enqueuing a new message request 400. As an example, an Enqueue Adjunct Processor Queue instruction is executed by a processor (e.g., processor 102, 150) to enqueue the message request. An address and a length of a next part of the message are set 402. A determination is made as to whether this is the first part of the message 404. If it is the first part of a new message, then the program sets a selected indicator, e.g., a new indicator N (e.g., to 1) 406. The system responds by assigning a queue entry if one is available; otherwise, it returns an error. The system proceeds to enqueue the message part to a new queue entry.

Subsequent to setting the new indicator or if it is not the first part of the message, then a further determination is made as to whether this is the final part of the message 408. If it is the final part of the message, then a selected indicator, e.g., L, is set (e.g., to 1) 410. Thereafter, or if it is not the final part of the message, then processing continues within an attempt to enqueue the message 412 and a condition code (cc) results. For instance, the system responds to the Enqueue Adjunct Processor Queue instruction to indicate a level of success by setting the condition code within a select location, such as a program status word. The following condition codes may be presented: cc0—the enqueue was successful and an entire request message is being forwarded to the adjunct processor (the last indication (L) is set for this to occur) 414; cc1—the system has received the entire message part presented and requests that the program continues by sending the next part; cc2—the system has received only a portion (segment) of the presented message part and requests that the program continues by sending the next message segment in the part; and cc3—an error occurred that has caused the enqueue operation for the current message to end 420.

Figure 5A:
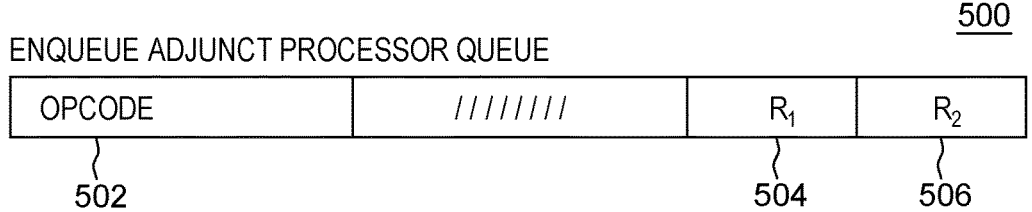
FIGS. 5A-5G depict an example of an Enqueue Adjunct Processor Queue instruction used in accordance with one or more aspects of the present invention.

In one example, cc3 error conditions are further qualified by a response code returned by, e.g., an adjunct processor queue status word, which is supplied to the program in a select register, such as general register 1 (e.g., GR1 (540; FIG. 5C), described below). Some response codes indicate some form of a hardware failure and therefore, the enqueue request has to be abandoned (e.g., deconfigured, checkstop, etc.). Some indicate a transient error, which is expected to change with or without program intervention (e.g., resetting, busy, etc.). Others indicate operational errors where the program cannot proceed with the message request until some other action is completed. An example of an operational error is where there is no available queue space and the program has to dequeue one or more replies to existing messages to create queue space. Yet other errors indicate a logical error on the part of the program (e.g., specifying an invalid AP queue entry index). These are generally program bugs and the system does nothing to alter the queue state for such errors. If previous successful executions of the enqueue instruction have left a partial message in a system buffer (i.e., queue entry), that queue entry becomes unusable for further traffic. When such a programming error occurs, the program is expected to reset the entire adjunct processor queue, thus causing messages (e.g., all messages) enqueued along with any responses to be deleted from the adjunct processor queue.

In accordance with an aspect of the present invention, another category of error is defined, referred to as tolerable program errors. When these errors occur, any partial message accumulated in an adjunct processor queue entry is discarded (e.g., as part of the Enqueue Adjunct Processor Queue instruction processing) and the entry is returned to an available state, allowing its use for subsequent message traffic. One example of a tolerable program error is an incorrect message length condition (e.g., the attempted enqueuing of a message that is longer than the maximum supported message length).

As an example, a system may, in accordance with one or more aspects of the present invention, support multiple buffer sizes (e.g., multiple maximum message lengths), such as 12 KiB and 24 KiB (and/or other sizes). In such a system that supports an extended message limit facility in which messages longer than one length, e.g., longer than 12 KiB, may be supported but is still backwards compatible and supports messages that are of a different length (e.g., up to 12 KiB or less), a program may become confused. For instance, a system may support dynamic reconfiguration in which an adjunct processor queue that supports up to a maximum of a select length (e.g., 24 KiB) may be physically exchanged for an adjunct processor that supports up to a maximum of another select length (e.g., 12 KiB). In such an environment, a program may be confused as to which message length is being currently supported. This may be compounded in a virtual environment where the real resources that are used to back a virtual resource are changed, or the virtual machine is dynamically switched from using a virtual adjunct processor to using a physical resource adjunct processor of the same identification.

Such errors are to be considered, in accordance with one or more aspects of the present invention, as tolerable program errors. With such errors, the message part of any accumulated partial message associated with the error is discarded. Without this recognition, the program is forced to accept that one queue entry remains unavailable until the entire adjunct processor queue is reset. The program has no way to clear an individual message or complete the message in a way that produces predictable results. Having to reset the entire adjunct processor queue forces the discarding of the good messages, the partially enqueued messages and message replies. Such a response to this situation forces the program to undertake more extensive error recovery than should be needed. However, recognizing an error of toleration contains the error recovery to the one message that was responsible for the error. It does not impact other requests already enqueued and it retains the availability of the full queue capacity without any recovery actions directed to the adjunct processor queue itself.

Further, where the adjunct processor queue is shared among a number of programs and one program attempts to enqueue a message of a length greater than the maximum supported size, other programs will not be affected by such an error. If this was treated as a program logic error, then other programs may be impacted either by the reduced number of available queue entries or by invoking a generic queue reset.

One example of handling such errors is described with reference to FIG. 4B. As an example, if an enqueue instruction, such as the Enqueue Adjunct Processor Queue instruction, ends in an error 420, then in accordance with an aspect of the present invention, a determination is made as to whether the error was due to an attempt to exceed the maximum supported message length 422. If not, then this processing is complete. If, however, the error was due to an attempt to exceed the maximum supported message length, a determination is made as to whether an extended message length is supported in the computing environment by one or more adjunct processors 430. If it is supported, then in accordance with an aspect of the present invention, instead of leaving a partial message in the queue entry in which the error occurred, the partial message accumulated in the affected queue entry is discarded 432. This returns the queue entry to the available state, allowing its use for subsequent messages. Further, in contrast to other categories of errors which require a complete queue reset to recover the blocked entry, in accordance with one or more aspects of the present invention, other messages and/or message parts remain on the queue and continue to be processed normally.

Returning to inquiry 430, if the extended message length is not supported in the computing environment, then this processing is complete. The error is handled as other program errors. For instance, the recovery action causes the messages and message parts of the queue, regardless of whether they are related to the error (e.g., incorrect message length), to be discarded from the queue.

Further details of one embodiment of an Enqueue Adjunct Processor Queue instruction are described with reference to FIGS. 5A-5G. Referring to FIG. 5A, in one example, an Enqueue Adjunct Processor Queue instruction 500 includes an operation code (opcode) 502 (e.g., bits 0-15 of a 32-bit instruction) that indicates an enqueue operation of an adjunct processor queue; a first register field ($R_1$) 504 (e.g., bits 24-27) used to specify a first operand; and a second register field ($R_2$) 506 (e.g., bits 28-31) used to specify a second operand. As an example, the $R_1$ and $R_2$ fields each designate an even-odd pair of general registers and are to designate an even numbered register; otherwise, a specification exception is recognized. When access-register translation is in effect, the $R_2$ field also designates an access register/general-register pair for the even register.

In operation, as an example, the first and second operands are placed in an adjunct processor queue designated by an adjunct processor queue number and an adjunct processor queue entry index in a specified register (e.g., general register 0), provided that the queue is not full. A condition code is set to indicate the result of the action.

In one embodiment, the Enqueue Adjunct Processor Queue instruction employs a plurality of general registers, including general registers 0 and 1, as well as registers $R_1$, $R_1$+1, $R_2$ and $R_2$+1, examples of which are further described below.

Figure 5B:
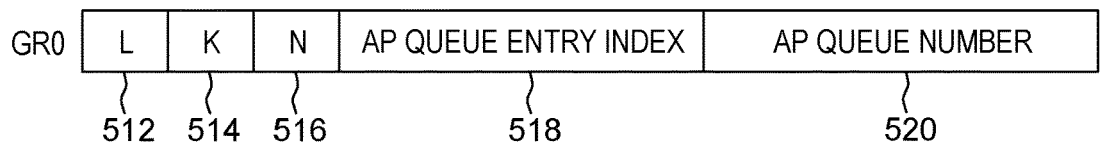
Figure 5C:
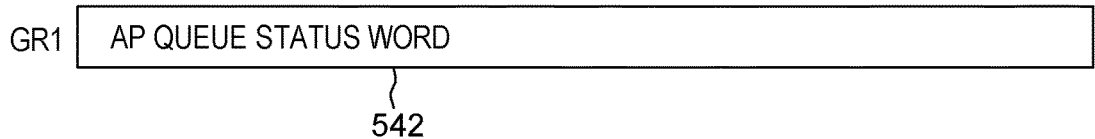

Referring to FIG. 5B, in one embodiment, general register 0 (GR0) 510 is, e.g., a 64-bit register that includes, for instance:

Last-part indicator (L) 512: This field (e.g., bit 33) is the last-part designation indicator. For instance, when L is zero, the adjunct processor message part is not the last part. When L is one, the adjunct processor message part is the last part and the adjunct processor queue entry enters the request-pending state (QP) upon completion of the Enqueue Adjunct Processor Queue instruction;

Key indicator (K) 514: This field (e.g., bits 36-39) specifies the storage protection key associated with the second operand.

Index-type indicator (N) 516: This field (e.g., bit 42) specifies whether a normal or an arbitrary index is to be used. As an example, when N is zero, an arbitrary index is designated, meaning that the CPU determines the adjunct processor queue entry index. When N is one, a normal index is designated, meaning that the adjunct processor queue entry field (described herein) contains the adjunct processor queue entry index to use.

Adjunct Processor Queue Entry Index (APEX) 518: This field (e.g., bits 43-47), when N is one, is a normal index that designates the adjunct processor queue entry used to enqueue the command request message part. When N is zero, this field is ignored, and the CPU attempts to select an adjunct processor queue entry in the available state.

Adjunct Processor Queue Number (APQN) 520: This field (e.g., bits 48-63) contains the AP queue number.

Referring to FIG. 5C, in one embodiment, general register 1 (GR1) 540 is, e.g., a 64-bit register that includes, for instance, an adjunct processor queue status word (APQSW) 542 (e.g., bits 32-63). This field is set to the adjunct processor queue status word upon completion of the Enqueue Adjunct Processor Queue instruction, unless otherwise stated.

Figure 5D:
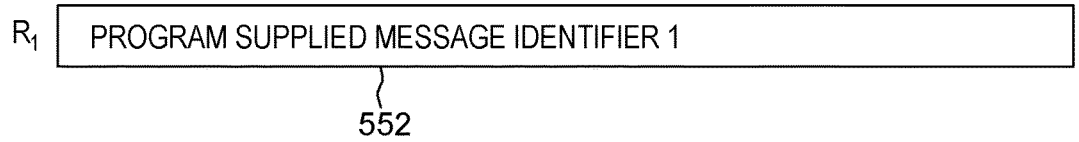
Figure 5E:
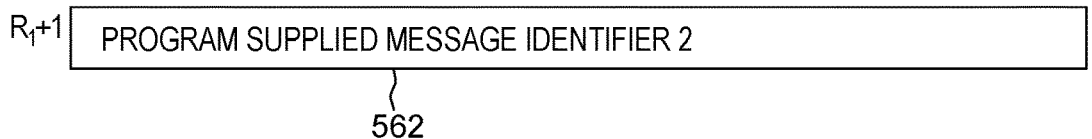

Referring to FIG. 5D, in one embodiment, register $R_1$ 550 is, e.g., a 64-bit register that includes a program supplied message identifier 1 (552), and register $R_1$+1 560 of FIG. 5E is, e.g., a 64-bit register that includes a program supplied message identifier 2 (562). The even-odd general register pair designated by the $R_1$ field includes the first operand, called the program supplied message identifier (PSMID). In one example, when N 516 is zero, the PSMID is stored into a PSMID-field of the adjunct processor queue entry. When N 516 is one, the first operand is ignored.

Figure 5F:
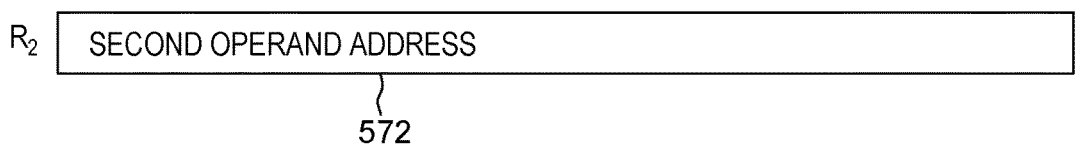
Figure 5G:
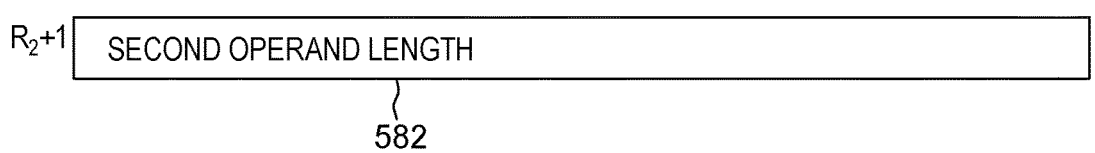

Referring to FIG. 5F, in one embodiment, register $R_2$ 570 is, e.g., a 64-bit register that includes an address of the second operand (572), and register $R_2+1$ 580 of FIG. 5G is, e.g., a 64-bit register that includes a length of the second operand (582). The second operand, called the command request message, is a byte string and is addressed by the contents of even-odd general-register pair $R_2$.

General register $R_2$ contains the logical address of the command request message part being enqueued. The address in general register $R_2$ is subject to access-register translation (ART), when ART is in effect, in one example. General register $R_2+1$ specifies the length of the request message part. The total sum of the lengths of all message parts may be, e.g., up to 12 KiB, in one example. In other examples, the total sum may be greater than 12 KiB if the extended message limit facility is supported.

Although specific fields, locations of fields, sizes of fields, bits and values of fields or bits are described in one embodiment herein for the Enqueue Adjunct Processor Queue instruction and its associated registers, other fields, locations of fields, sizes of fields, bits and/or values of fields or bits may be used without departing from a spirit of one or more aspects of the invention. Fields and/or bits of each of the general registers not described herein may be blank, have a predefined value (e.g., zero), and/or include values to be ignored in one embodiment. Many possibilities exist.

In one example, condition code 0 is set when the original value of the L indicator is, e.g., one and the complete adjunct processor message or last adjunct processor message part has been placed in the message field of the adjunct processor queue entry. The adjunct processor queue entry enters the request pending state (QP). At the completion of the operation, the following information is returned to the program, as an example:

General register 0 is unchanged from its original value.
The APQSW field in general register 1 contains the AP queue status word.
The $R_1$ (first) operand is unchanged from its original value.
The second operand length in general register $R_2+1$ is decremented by the number of bytes stored into the adjunct processor queue entry message field, and the second operand address in general register $R_2$ is incremented by the same amount.

In one example, condition code 1 is set when the original value of the L indicator is, e.g., zero and the entire adjunct processor message part has been placed in the message field of the adjunct processor queue entry. At the completion of the operation, the following information is returned to the program, as an example:

General register 0 is unchanged from its original value except that N is set to, e.g., one, and the APEX field is set to the index value of the adjunct processor queue entry being operated upon.
General register 1 is unchanged from its original value.
The $R_1$ (first) operand is unchanged from its original value.
The second operand length in general register $R_2+1$ is decremented by the number of bytes stored into the adjunct processor queue entry message field, and the second operand address in general register $R_2$ is incremented by the same amount.

When the enqueue adjunct processor queue instruction is issued under the changed conditions, with a new second operand, and by any central processing unit, the Enqueue Adjunct Processor Queue instruction resumes at the next byte to be placed into the adjunct processor queue entry message field from memory.

As an example, condition code 2 is set when the operation is completed because the central processing unit recognized a segment boundary prior to reaching the end of the part specified by the $R_2$ operand. At the completion of the operation, the general register information returned to the program is the same as for condition code 1.

In one example, when the enqueue adjunct processor queue instruction is issued under the changed conditions, and by any central processing unit, the Enqueue Adjunct Processor Queue instruction resumes at the next byte to be placed into the adjunct processor queue entry from memory.

As an example, condition code 3 is set when any of the following unusual conditions exist:

AP queue number not valid (01)
AP queue reset in progress (02)
AP deconfigured (03)
AP checkstop (04)
AP busy (05)
No available entries (10)
Queue index invalid (11)
Queue-entry not partially filled (13)
Message-part length (15)
Required facility not installed (16)
Invalid Cryptographic Domain (42)

At the completion of the operation, the following information is returned to the program, as an example:

General register 0 is unchanged from its original value.
The APQSW field in general register 1 contains the adjunct processor queue status word.
The $R_1$ and $R_2$ operands are unchanged from their original values.

In one example, a serialization and checkpoint-synchronization function is performed before the operation begins and again after the operation is completed.

When the Enqueue Adjunct Processor Queue instruction completes with, for instance, condition code 0, 1, or 2, and when general register $R_2$ is incremented, it is incremented, in one example, using the operand address generation arithmetic of the machine, producing an intermediate address value. Then, according to the current addressing mode, the rightmost 24, 31, or 64 bits of the intermediate address with an appropriate number of leftmost zeros forms the resultant second operand address which is placed back in general register $R_2$.

As observed by other central processing units and channel programs, references to the second operand may be multiple access references, accesses to these storage locations are not necessarily block concurrent, and the sequence of these accesses or references is undefined.

One or more aspects of the present invention are inextricably tied to computer technology and facilitate processing, including adjunct processor message processing, within a computing environment, improving performance thereof. In one or more aspects, a message limit value is provided in which a value of, e.g., zero indicates that an AP extended message limit facility is not installed, and a default message length, e.g., of 12 KiB, applies. A non-zero value indicates that the facility is installed and specifies a maximum message length in units of, e.g., 4 KiB. Further, in one or more aspects, an incorrect message length condition is defined as a tolerable program error, which results in discarding of any partial message accumulated in the AP queue entry and the returning of the entry to an available state, allowing its use for subsequent message traffic.

Although embodiments are described herein, other variations and embodiments are possible.

One or more aspects of the present invention may be incorporated and used in many computing environments. One example computing environment is described with reference to FIG. 6A. As an example, the computing environment is based on the z/Architecture® instruction set architecture, offered by International Business Machines Corporation, Armonk, New York. The z/Architecture instruction set architecture, however, is only one example architecture. The computing environment may also be based on other architectures of International Business Machines Corporation, and/or architectures of other companies.

Figure 6A:
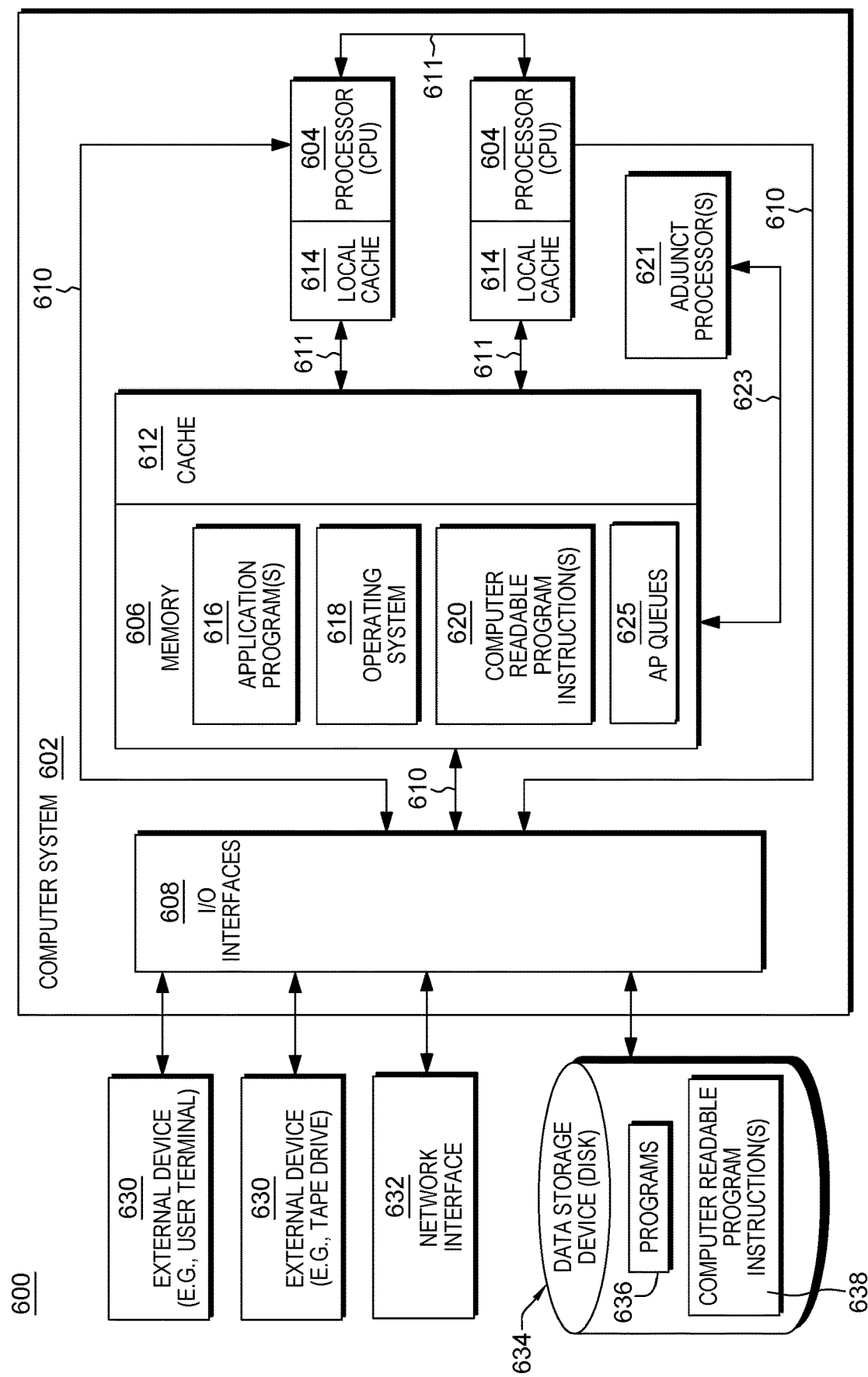
FIG. 6A depicts one example of another computing environment to incorporate and use one or more aspects of the present invention.

As shown in FIG. 6A, a computing environment 600 includes, for instance, a computer system 602 shown, e.g., in the form of a general-purpose computing device. Computer system 602 may include, but is not limited to, one or more processors or processing units 604 (e.g., central processing units (CPUs)), a memory 606 (a.k.a., system memory, main memory, main storage, central storage or storage, as examples), and one or more input/output (I/O) interfaces 608, coupled to one another via one or more buses and/or other connections. For instance, processors 604 and memory 606 are coupled to I/O interfaces 608 via one or more buses 610, and processors 604 are coupled to one another via one or more buses 611.

Bus 611 is, for instance, a memory or cache coherence bus, and bus 610 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 606 may include, for instance, a cache 612, such as a shared cache, which may be coupled to local caches 614 of processors 604 via, e.g., one or more buses 611. Further, memory 606 may include one or more programs or applications 616, at least one operating system 618, and one or more computer readable program instructions 620. Computer readable program instructions 620 may be configured to carry out functions of embodiments of aspects of the invention.

In one embodiment, memory 606 (e.g., at least a hardware system area of memory 606) is coupled to one or more adjunct processors 621 via one or more adjunct processor buses 623 and in one or more embodiments, via an AP transport layer. The hardware system area of memory 606 includes, for instance, one or more AP queues 625.

Computer system 602 may communicate via, e.g., I/O interfaces 608 with one or more external devices 630, such as a user terminal, a tape drive, a pointing device, a display, and one or more data storage devices 634, etc. A data storage device 634 may store one or more programs 636, one or more computer readable program instructions 638, and/or data, etc. The computer readable program instructions may be configured to carry out functions of embodiments of aspects of the invention.

Computer system 602 may also communicate via, e.g., I/O interfaces 608 with network interface 632, which enables computer system 602 to communicate with one or more networks, such as a local area network (LAN), a general wide area network (WAN), and/or a public network (e.g., the Internet), providing communication with other computing devices or systems.

Computer system 602 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 602. Examples, include, but are not limited to: microcode, device drivers, redundant processing units, external disk drive arrays, RAID systems, tape drives, and data archival storage systems, etc.

Computer system 602 may be operational with numerous other general-purpose or special purpose computing system environments or configurations. Examples of well-known computing systems, environments, and/or configurations that may be suitable for use with computer system 602 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 6B:
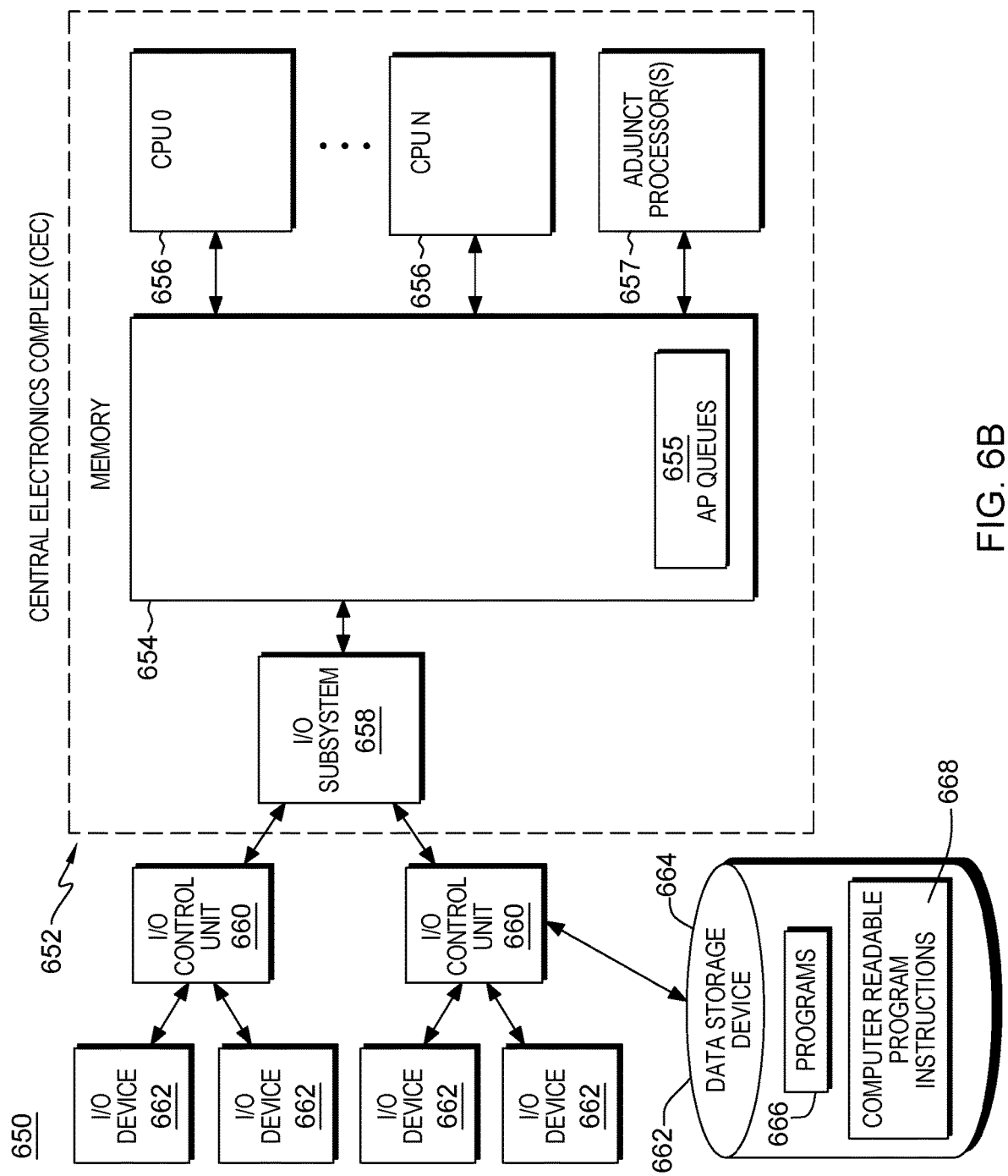
FIG. 6B depicts yet another example of a computing environment to incorporate and use one or more aspects of the present invention.

Another example of a computing environment to incorporate and use one or more aspects of the present invention is described below with reference to FIG. 6B. As an example, the computing environment of FIG. 6B can be based on the z/Architecture® instruction set architecture offered by International Business Machines Corporation. The z/Architecture instruction set architecture, however, is only one example architecture. Again, the computing environment may be based on other architectures of International Business Machines Corporation, and/or architectures of other companies.

In one example, a computing environment 650 includes a central electronics complex (CEC) 652. Central electronics complex 652 includes a plurality of components, such as, for instance, a memory 654 (a.k.a., system memory, main memory, main storage, central storage, storage) coupled to one or more processors (a.k.a., central processing units (CPUs)) 656 and to an input/output (I/O) subsystem 658. Further, in one embodiment, memory 654 (e.g., at least a hardware system area of memory 654) is coupled to one or more adjunct processors 657 via one or more adjunct processor buses and in one or more embodiments, via an AP transport layer. The hardware system area of memory 654 includes, for instance, one or more AP queues 655.

I/O subsystem 658 can be a part of the central electronics complex or separate therefrom. It directs the flow of information between main storage 654 and input/output control units 660 and input/output (I/O) devices 662 coupled to the central electronics complex.

Many types of I/O devices may be used. One particular type is a data storage device 664. Data storage device 664 can store one or more programs 666, one or more computer readable program instructions 668, and/or data, etc. The computer readable program instructions can be configured to carry out functions of embodiments of aspects of the invention.

Central electronics complex 652 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central electronics complex 652. Examples include, but are not limited to: microcode, device drivers, redundant processing units, external disk drive arrays, RAID systems, tape drives, and data archival storage systems, etc.

Further, central electronics complex 652 can be operational with numerous other general-purpose or special-purpose computing system environments or configurations. Examples of well-known computing systems, environments, and/or configurations that may be suitable for use with central electronics complex 652 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 6D:
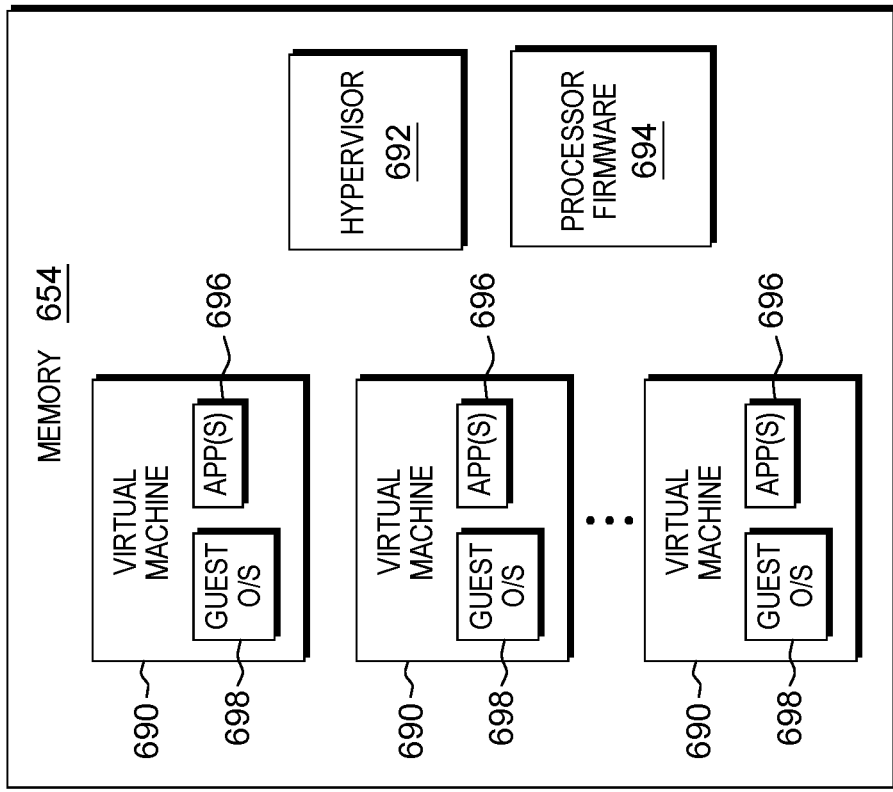
FIG. 6D depicts another example of further details of a memory of FIG. 6B, in accordance with one or more aspects of the present invention.
Figure 6C:
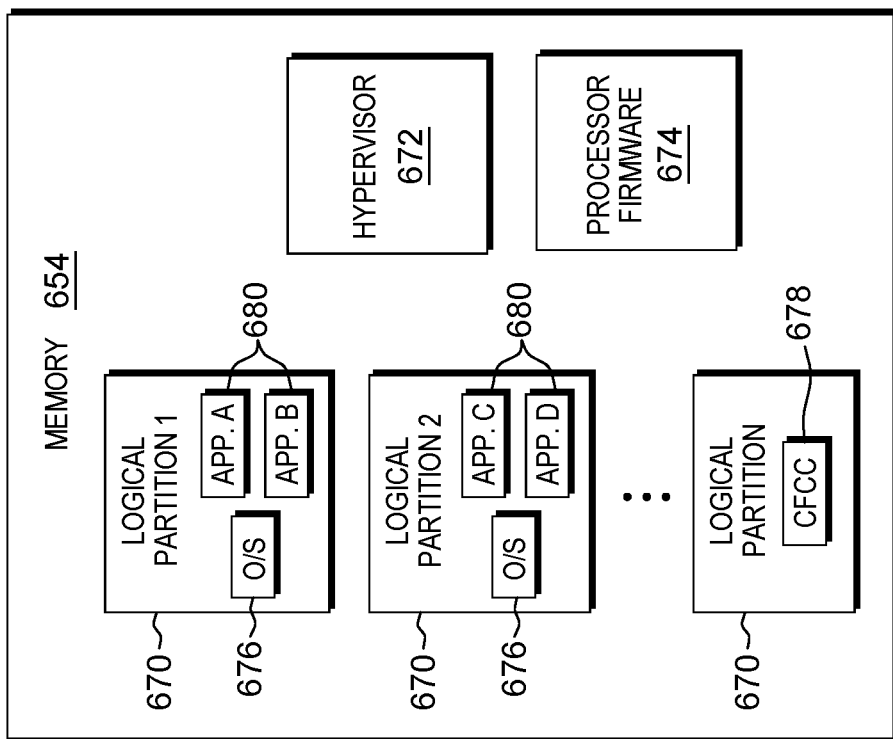
FIG. 6C depicts one example of further details of a memory of FIG. 6B, in accordance with one or more aspects of the present invention.

Central electronics complex 652 provides in one or more embodiments logical partitioning and/or virtualization support. In one embodiment, as shown in FIG. 6C, memory 654 includes, for example, one or more logical partitions 670, a hypervisor 672 that manages the logical partitions, and processor firmware 674. One example of hypervisor 672 is the Processor Resource/System Manager (PR/SM), offered by International Business Machines Corporation, Armonk, New York. As used herein, firmware includes, e.g., the microcode or millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware. Further, in one example, it includes the transport layer (e.g., transport layer 110, 160). Although PR/SM is offered as one example, other hypervisors may be used in accordance with one or more aspects of the present invention. PR/SM is a trademark or registered trademark of International Business Machines Corporation in at least one jurisdiction.

Each logical partition 670 is capable of functioning as a separate system. That is, each logical partition can be independently reset, run a guest operating system 676 such as the z/OS® operating system, offered by International Business Machines Corporation, Armonk, New York, or other control code 678, such as coupling facility control code (CFCC), and operate with different programs 680. An operating system or application program running in a logical partition appears to have access to a full and complete system, but in reality, only a portion of it is available. Although z/OS is offered as an example, other operating systems may be used in accordance with one or more aspects of the present invention.

Memory 654 is coupled to at least CPUs 656 (FIG. 6B), which are physical processor resources that can be allocated to the logical partitions. For instance, a logical partition 670 includes one or more logical processors, each of which represents all or a share of a physical processor resource 656 that can be dynamically allocated to the logical partition.

In yet a further embodiment, the central electronics complex provides virtual machine support (either with or without logical partitioning support). As shown in FIG. 6D, memory 654 of central electronics complex 652 includes, for example, one or more virtual machines 690, a virtual machine manager, such as a hypervisor 692, that manages the virtual machines, and processor firmware 694. One example of hypervisor 692 is the z/VM® hypervisor, offered by International Business Machines Corporation, Armonk, New York. The hypervisor is sometimes referred to as a host. z/OS and z/VM are trademarks or registered trademarks of International Business Machines Corporation in at least one jurisdiction.

The virtual machine support of the CPC provides the ability to operate large numbers of virtual machines 690, each capable of operating with different programs 696 and running a guest operating system 698, such as the Linux® operating system. Each virtual machine 690 is capable of functioning as a separate system. That is, each virtual machine can be independently reset, run a guest operating system, and operate with different programs. An operating system or application program running in a virtual machine appears to have access to a full and complete system, but in reality, only a portion of it is available. Although z/VM and Linux are offered as examples, other virtual machine managers and operating systems may be used in accordance with one or more aspects of the present invention. The registered trademark Linux® is used pursuant to a sublicense from the Linux Foundation, the exclusive licensee of Linus Torvalds, owner of the mark on a worldwide basis.

Figure 7A:
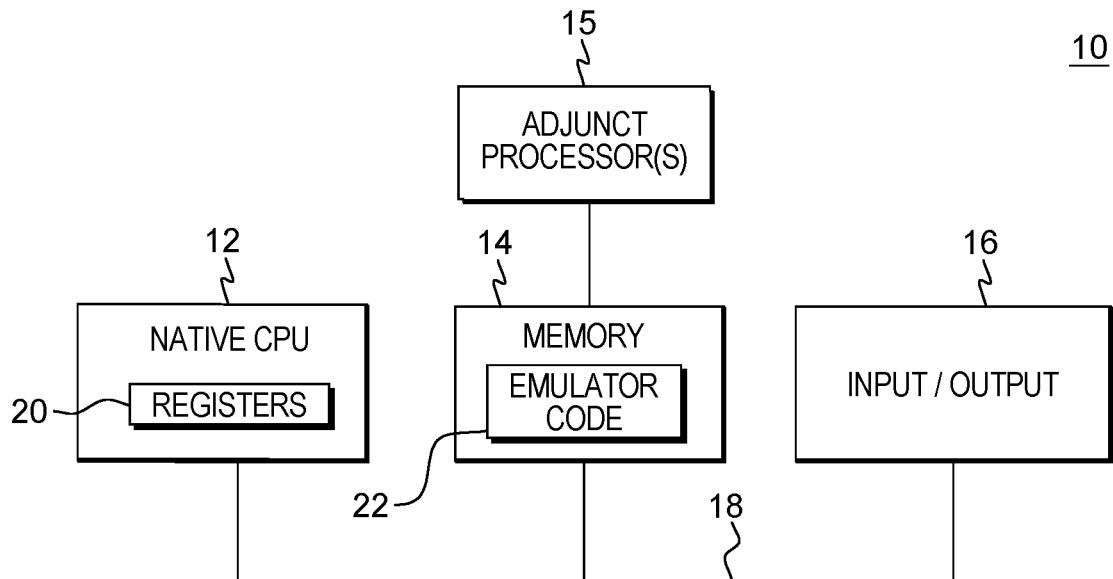
FIG. 7A depicts another example of a computing environment to incorporate and use one or more aspects of the present invention.

Another embodiment of a computing environment to incorporate and use one or more aspects of the present invention is described with reference to FIG. 7A. In this example, a computing environment 10 includes, for instance, a native central processing unit (CPU) 12, a memory 14, and one or more input/output devices and/or interfaces 16 coupled to one another via, for example, one or more buses 18 and/or other connections. As examples, computing environment 10 may include a Power® processor offered by International Business Machines Corporation, Armonk, New York; an HP Superdome with Intel Itanium II processors offered by Hewlett Packard Co., Palo Alto, California; and/or other machines based on architectures offered by International Business Machines Corporation, Hewlett Packard, Intel Corporation, Oracle, or others. Power is a trademark or registered trademark of International Business Machines Corporation in at least one jurisdiction. Intel and Itanium are trademarks or registered trademarks of Intel Corporation or its subsidiaries in the United States and other countries.

Native central processing unit 12 includes one or more native registers 20, such as one or more general purpose registers and/or one or more special purpose registers used during processing within the environment. These registers include information that represents the state of the environment at any particular point in time.

Moreover, native central processing unit 12 executes instructions and code that are stored in memory 14. In one particular example, the central processing unit executes emulator code 22 stored in memory 14. This code enables the computing environment configured in one architecture to emulate another architecture. For instance, emulator code 22 allows machines based on architectures other than the z/Architecture instruction set architecture, such as Power processors, HP Superdome servers or others, to emulate the z/Architecture instruction set architecture and to execute software and instructions developed based on the z/Architecture instruction set architecture.

Figure 7B:
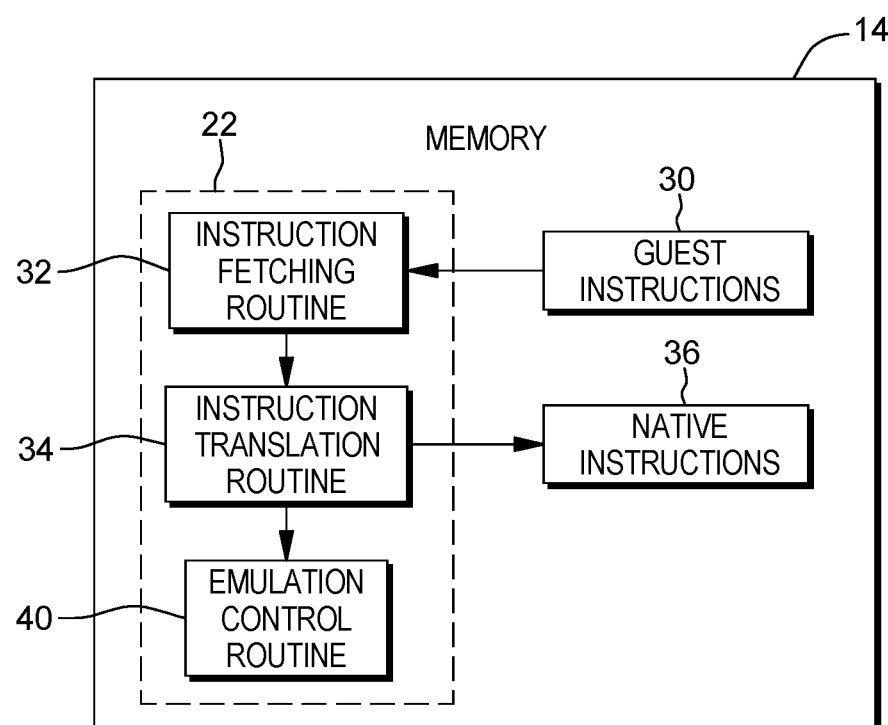
FIG. 7B depicts further details of the memory of FIG. 7A, in accordance with one or more aspects of the present invention.

Further details relating to emulator code 22 are described with reference to FIG. 7B. Guest instructions 30 stored in memory 14 comprise software instructions (e.g., correlating to machine instructions) that were developed to be executed in an architecture other than that of native CPU 12. For example, guest instructions 30 may have been designed to execute on a processor based on the z/Architecture instruction set architecture, but instead, are being emulated on native CPU 12, which may be, for example, an Intel Itanium II processor. In one example, emulator code 22 includes an instruction fetching routine 32 to obtain one or more guest instructions 30 from memory 14, and to optionally provide local buffering for the instructions obtained. It also includes an instruction translation routine 34 to determine the type of guest instruction that has been obtained and to translate the guest instruction into one or more corresponding native instructions 36. This translation includes, for instance, identifying the function to be performed by the guest instruction and choosing the native instruction(s) to perform that function.

Further, emulator code 22 includes an emulation control routine 40 to cause the native instructions to be executed. Emulation control routine 40 may cause native CPU 12 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 36 may include loading data into a register from memory 14; storing data back to memory from a register; or performing some type of arithmetic or logic operation, as determined by the translation routine.

Each routine is, for instance, implemented in software, which is stored in memory and executed by native central processing unit 12. In other examples, one or more of the routines or operations are implemented in firmware, hardware, software or some combination thereof. The registers of the emulated processor may be emulated using registers 20 of the native CPU or by using locations in memory 14. In embodiments, guest instructions 30, native instructions 36 and emulator code 22 may reside in the same memory or may be disbursed among different memory devices.

Further, in one embodiment, computing environment 10 includes one or more adjunct processors 15 coupled to memory 14. The one or more adjunct processors are defined in one architecture and are configured to emulate another architecture. For example, an adjunct processor obtains guest commands of the architecture being emulated, translates the guest commands into native commands of the one architecture and executes the native commands.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention. For instance, each may be configured to incorporate and/or use one or more aspects of an extended message limit facility, in accordance with one or more aspects of the present invention.

Although various embodiments are described herein, many variations and other embodiments are possible without departing from a spirit of aspects of the present invention. It should be noted that, unless otherwise inconsistent, each aspect or feature described herein, and variants thereof, may be combinable with any other aspect or feature.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
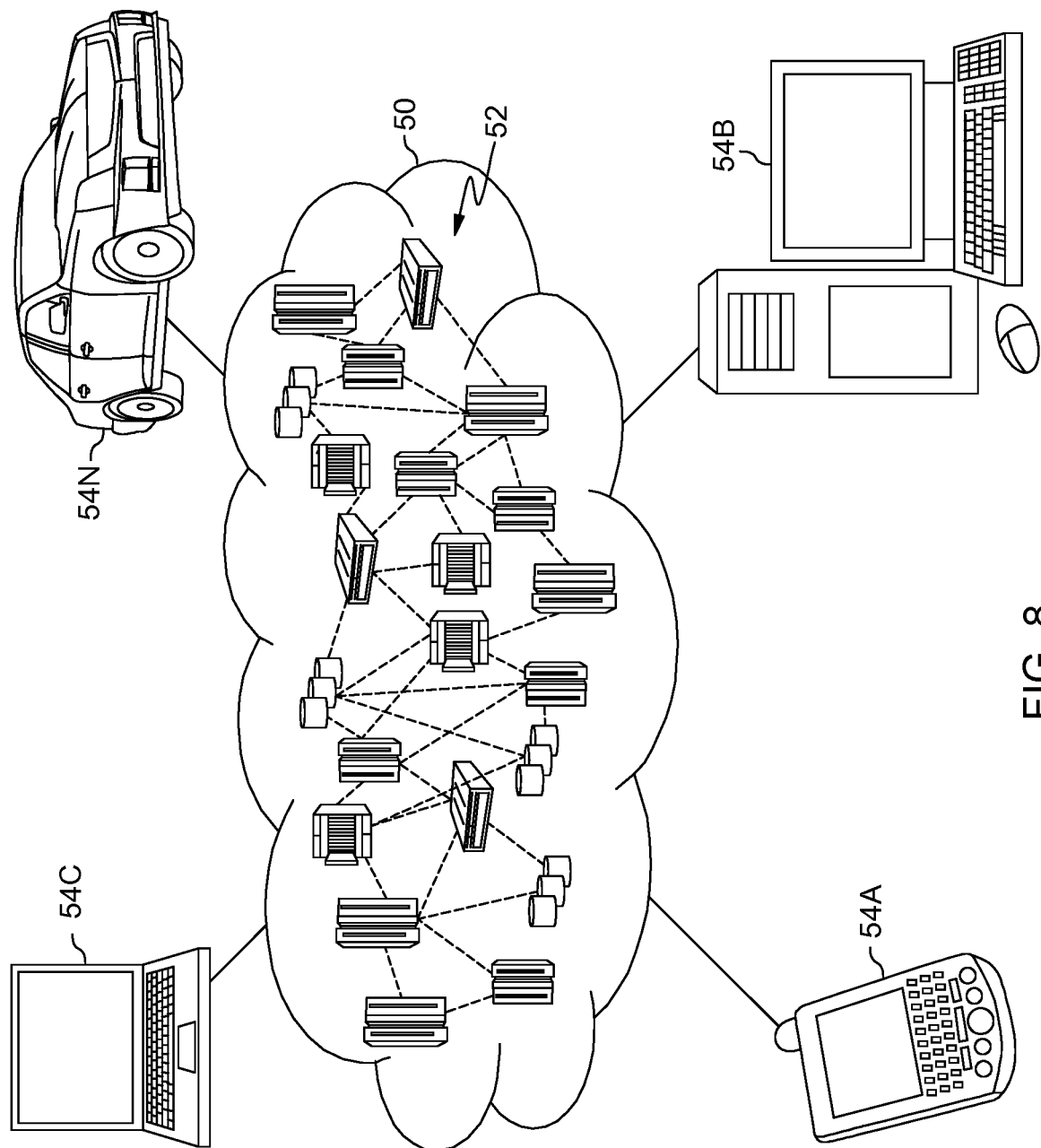
FIG. 8 depicts one embodiment of a cloud computing environment, in accordance with one or more aspects of the present invention.

Referring now to FIG. 8, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 52 and cloud computing environment 50 can communicate with any type of computerized device over any type of network and/or network addressable connection (e.g., using a web browser).

Figure 9:
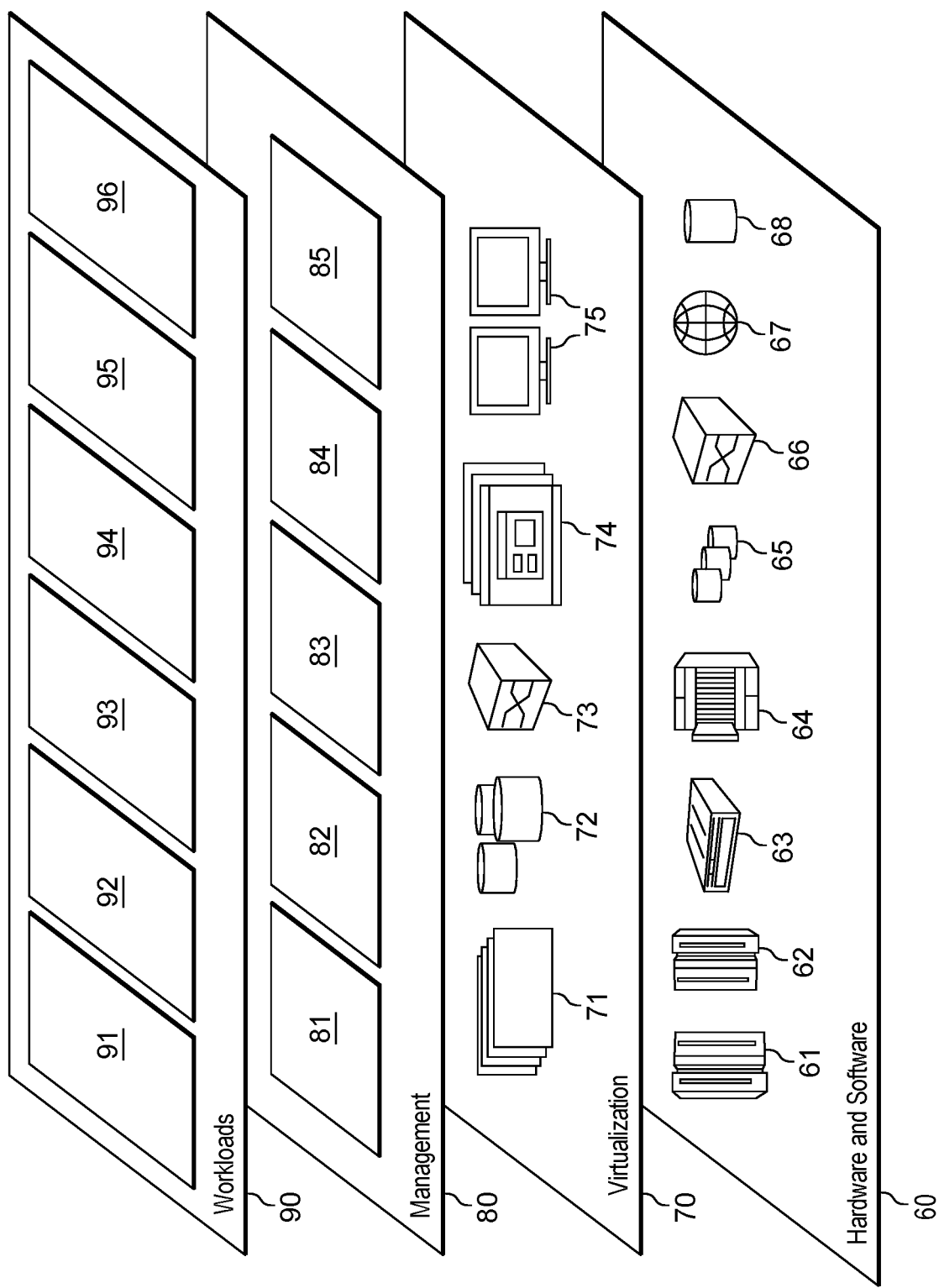
FIG. 9 depicts one example of abstraction model layers, in accordance with one or more aspects of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and adjunct processor message processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, commands or operations may be used. Additionally, different types of indications may be specified, as well as different types of adjunct processors. Further, different maximum message lengths and/or limits may be supported. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising: one or more computer readable storage media and program instructions collectively stored on the one or more computer readable storage media to perform a method comprising:

obtaining a message limit value to be used in enqueuing one or more messages on a queue of a device of the computing environment, the message limit value indicating that an extended message limit facility is installed and that an extended maximum message length is supported by the device, the extended maximum message length being different from a default maximum message length supported by the device; and enqueuing at least one message of an extended length on the queue of the device, based on determining that the extended message limit facility is installed, that the extended maximum message length is supported and that the obtained message limit value has a defined relationship with a select value.

2. The computer program product of claim 1, wherein based on the message limit value having a value other than a defined value, the extended maximum message length is supported.

3. The computer program product of claim 1, wherein based on the message limit value having a defined value, the extended maximum message length is unsupported.

4. The computer program product of claim 1, wherein the method further comprises determining the extended maximum message length, based on determining that the message limit value has the defined relationship with the select value.

5. The computer program product of claim 4, wherein the determining the extended maximum message length includes using an equation, the equation comprising:

the extended maximum message length is equal to the message limit value multiplied by a size of a unit of memory.

6. The computer program product of claim 5, wherein the size of the unit of memory is 4 kibibytes.

7. The computer program product of claim 1, wherein the method further comprises:

determining, based on obtaining an error in enqueuing a message on the queue of the device, a reason for the error; and determining whether the error, based on the reason for the error, is a tolerated error in which one or more message parts related to enqueuing the message are discarded.

8. The computer program product of claim 7, wherein the reason for the error is an incorrect message length condition based on attempting to enqueue the message on the queue of the device in which a message length of the message is longer than a maximum message length supported by the device.

9. The computer program product of claim 8, wherein the determining whether the error is a tolerated error comprises determining whether the extended maximum message length is supported in the computing environment, wherein the error is a tolerated error based on determining that the extended maximum message length is supported in the computing environment.

10. The computer program product of claim 1, wherein the device is an adjunct processor.

11. A computer system for facilitating processing within a computing environment, the computer system comprising:

a memory; and at least one processor in communication with the memory, wherein the computer system is configured to perform a method, said method comprising:

obtaining a message limit value to be used in enqueuing one or more messages on a queue of a device of the computing environment, the message limit value indicating that an extended message limit facility is installed and that an extended maximum message length is supported by the device, the extended maximum message length being different from a default maximum message length supported by the device; and enqueuing at least one message of an extended length on the queue of the device, based on determining that the extended message limit facility is installed, that the extended maximum message length is supported and that the obtained message limit value has a defined relationship with a select value.

12. The computer system of claim 11, wherein the method further comprises determining the extended maximum message length, based on determining that the message limit value has the defined relationship with the select value.

13. The computer system of claim 12, wherein the determining the extended maximum message length includes using an equation, the equation comprising:

the extended maximum message length is equal to the message limit value multiplied by a size of a unit of memory.

14. The computer system of claim 11, wherein the method further comprises:

determining, based on obtaining an error in enqueuing a message on the queue of the device, a reason for the error; and determining whether the error, based on the reason for the error, is a tolerated error in which one or more message parts related to enqueuing the message are discarded.

15. The computer system of claim 14, wherein the reason for the error is an incorrect message length condition based on attempting to enqueue the message on the queue of the device in which a message length of the message is longer than a maximum message length supported by the device.

16. A computer-implemented method of facilitating processing within a computing environment, the computer-implemented method comprising:

obtaining a message limit value to be used in enqueuing one or more messages on a queue of a device of the computing environment, the message limit value indicating that an extended message limit facility is installed and that an extended maximum message length is supported by the device, the extended maximum message length being different from a default maximum message length supported by the device; and enqueuing at least one message of an extended length on the queue of the device, based on determining that the extended message limit facility is installed, that the extended maximum message length is supported and that the obtained message limit value has a defined relationship with a select value.

17. The computer-implemented method of claim 16, further comprising determining the extended maximum message length, based on determining that the message limit value has the defined relationship with the select value.

18. The computer-implemented method of claim 17, wherein the determining the extended maximum message length includes using an equation, the equation comprising:

the extended maximum message length is equal to the message limit value multiplied by a size of a unit of memory.

19. The computer-implemented method of claim 16, further comprising:

determining, based on obtaining an error in enqueuing a message on the queue of the device, a reason for the error; and determining whether the error, based on the reason for the error, is a tolerated error in which one or more message parts related to enqueuing the message are discarded.

20. The computer-implemented method of claim 19, wherein the reason for the error is an incorrect message length condition based on attempting to enqueue the message on the queue of the device in which a message length of the message is longer than a maximum message length supported by the device.

21. The computer-implemented method of claim 20, wherein the determining whether the error is a tolerated error comprises determining whether the extended maximum message length is supported in the computing environment, wherein the error is a tolerated error based on determining that the extended maximum message length is supported in the computing environment.

22. A computer program product for facilitating processing within a computing environment, the computer program product comprising:

one or more computer readable storage media and program instructions collectively stored on the one or more computer readable storage media to perform a method comprising:

obtaining a message limit value to be used in enqueuing one or more messages on a queue of a device of the computing environment, the message limit value indicating that an extended maximum message length is supported by the device, the extended maximum message length being different from a default maximum message length supported by the device;

enqueuing at least one message of an extended length on the queue of the device, based on determining that the extended maximum message length is supported and that the obtained message limit value has a defined relationship with a select value;

determining, based on obtaining an error in enqueuing a message on the queue of the device, a reason for the error; and determining whether the error, based on the reason for the error, is a tolerated error in which one or more message parts related to enqueuing the message are discarded.

23. The computer program product of claim 22, wherein the reason for the error is an incorrect message length condition based on attempting to enqueue the message on the queue of the device in which a message length of the message is longer than a maximum message length supported by the device.

24. A computer-implemented method of facilitating processing within a computing environment, the computer-implemented method comprising:

obtaining a message limit value to be used in enqueuing one or more messages on a queue of a device of the computing environment, the message limit value indicating that an extended maximum message length is supported by the device, the extended maximum message length being different from a default maximum message length supported by the device; and enqueuing at least one message of an extended length on the queue of the device, based on determining that the extended maximum message length is supported and that the obtained message limit value has a defined relationship with a select value;

determining, based on obtaining an error in enqueuing a message on the queue of the device, a reason for the error; and determining whether the error, based on the reason for the error, is a tolerated error in which one or more message parts related to enqueuing the message are discarded.

25. The computer-implemented method of claim 24, wherein the reason for the error is an incorrect message length condition based on attempting to enqueue the message on the queue of the device in which a message length of the message is longer than a maximum message length supported by the device.

\* \* \* \* \*